United States Patent [19]
Kosarko

[11] 3,806,243
[45] Apr. 23, 1974

[54] SHROUD FOR SOUND MOTION PICTURE CAMERA

[75] Inventor: Gerald Julius Kosarko, Rochester, N.Y.

[73] Assignee: Eastman Kodak Company, Rochester, N.Y.

[22] Filed: Sept. 21, 1972

[21] Appl. No.: 291,135

[52] U.S. Cl.................................. 352/29, 352/78 R
[51] Int. Cl............................................ G03b 31/02
[58] Field of Search............ 352/72, 78, 26, 27, 29, 352/30; 353/15, 19; 242/55.19 A, 194; 274/4 R, 4 E; 179/100.2 Z

[56] References Cited
UNITED STATES PATENTS

| | | | |
|---|---|---|---|
| 3,417,938 | 12/1968 | Markakis et al. | 179/100.2 Z X |
| 3,176,310 | 3/1965 | Finnerty | 352/29 |
| 3,561,767 | 2/1971 | Negishi | 179/100.2 Z X |
| 3,619,045 | 11/1971 | Nemeth | 352/27 |
| 3,442,580 | 5/1969 | Winkler | 352/29 |
| 3,375,054 | 3/1968 | Hughes | 352/29 |

FOREIGN PATENTS OR APPLICATIONS

| | | | |
|---|---|---|---|
| 924,195 | 4/1963 | Great Britain | 352/72 |
| 830,776 | 3/1960 | Great Britain | 352/29 |
| 262,769 | 9/1967 | Austria | 352/27 |

*Primary Examiner*—Fred L. Braun
*Assistant Examiner*—Alan Mathews

[57] ABSTRACT

A sound motion picture camera is adapted to receive a film cartridge for recording of both images and sound upon a film strip loaded in the cartridge. The camera includes a shroud member, capstan and sound head which are located in the cartridge chamber of the camera such that they may be received into an opening or aperture of a received sound cartridge for effecting recording of sound onto the sound track of the received film strip by the sound head during a filming sequence. The shroud, which partially surrounds or encases both the capstan and sound head, is effective when contacted by the received film strip to guide it into a desired position relative to the capstan and sound head such that the film can be continuously advanced and sound can be recorded thereon.

10 Claims, 8 Drawing Figures

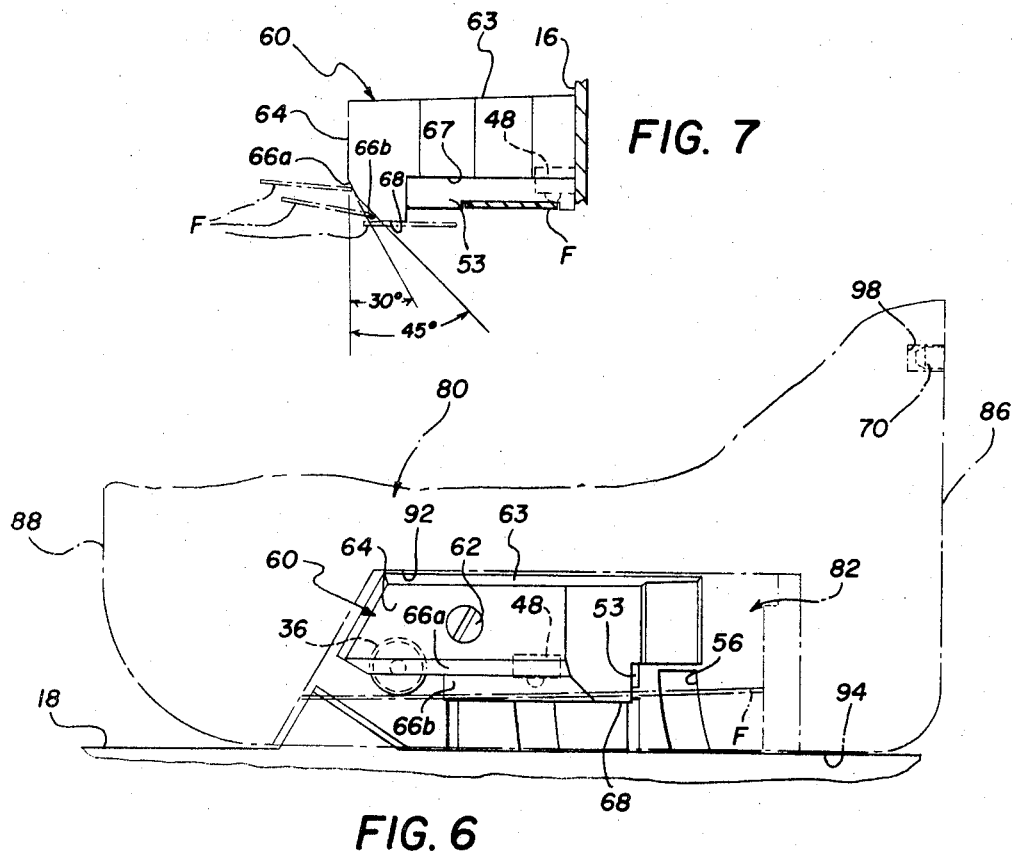
FIG. 7
FIG. 6
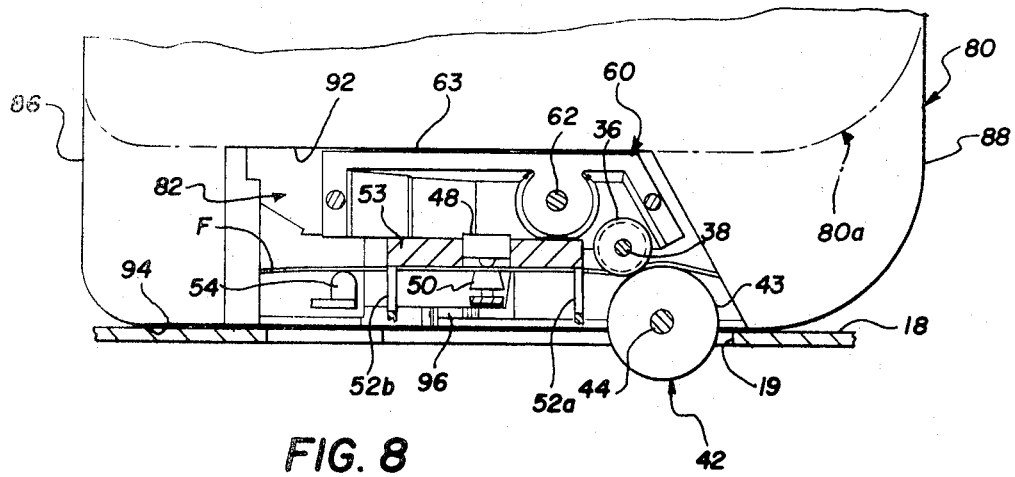
FIG. 8

SHROUD FOR SOUND MOTION PICTURE CAMERA

CROSS REFERENCE TO RELATED APPLICATIONS

Reference is made to commonly assigned copending U. S. Patent Application Ser. No. 248,513 entitled, "FILM CARTRIDGE" filed Apr. 28, 1972 in the names of Kosarko and Jenkins, and U. S. Patent Application Ser. No. 256,552 entitled, "FILM CARTRIDGE WITH GUIDE FINGER," filed May 24, 1972 in the name of Kosarko.

BACKGROUND OF THE INVENTION

1. Field of the Invention

The present invention relates to a sound motion picture camera and, more particularly, to a camera of the type adapted to receive a film cartridge for recording sound and images on a film strip contained therein.

2. Description of the Prior Art

Motion picture cameras and cartridges for recording sound and images upon a film strip are known in the art. It is known in the motion picture camera and cartridge art to provide cooperating members in the camera to position the film loaded in a cartridge relative to members of the camera. For example, U. S. Pat. No. 1,944,030 entitled, "CONTROL FOR FILM HANDLING APPARATUS" issued to Foster et al. on Jan. 16, 1934, describes a film guide which cooperates with a strip of film supported by a magazine for positioning the film relative to an exposure aperture of the camera. Although the film guide is positioned between film and the magazine, the Foster et al patent does not disclose a shroud for partially enclosing a portion of the sound recording apparatus of the camera to guide the film into the proper position with respect to such apparatus.

In U. S. Pat. No. 3,442,580 issued to Winkler on May 6, 1969 entitled, "MOTION PICTURE CAMERA OR PROJECTOR FOR FILM WITH SOUND TRACK" a drive sprocket in a camera is received in an opening in the cartridge after the cartridge is loaded into the camera, and the sprocket engages perforations in a strip of film for driving the film past sound recording apparatus in the camera. The sprocket is effective to maintain the film in position with respect to the sound recording apparatus once the film cartridge has been inserted properly into the camera. However, such a sprocket does not align or position the film strip as the cartridge is being received into the camera. The opening is located in the side of the cartridge that faces the camera's cartridge chamber during loading of the cartridge into the chamber. Therefore, the opening is hidden from view as the cartridge is loaded into the camera. The film strip exposed at the opening can become twisted, deflected, etc., during loading of the cartridge into the chamber, especially when this operation is being performed by amateur photographers, and because the opening is hidden from the view of the operator, the film can become damaged or positioned so that sound recording cannot be effected.

SUMMARY OF THE INVENTION

Accordingly, it is an object of the present invention to provide for the proper insertion of a film cartridge into a desired location in a sound camera so that a strip of the film is accurately located with respect to sound recording apparatus in the camera.

It is a further object to protect a portion of the sound recording apparatus of a sound motion picture camera during loading of a film cartridge into the camera, and to direct the film into its correct position with respect to the sound recording apparatus of the camera.

It is another object of the invention to provide an improved film guiding member in a camera which is positionable relative to a film cartridge and a film strip supported by the cartridge to accurately and reliably locate the film with respect to sound recording apparatus of the camera even when the cartridge is being loaded into the camera by relatively inexperienced camera operators.

Another object of the invention is to provide a shroud member which is shaped to partially enclose the sound head in a sound motion picture camera to protect the sound head and to guide or position a received film strip into contact with the sound head.

According to a preferred embodiment of the present invention, a sound apparatus having means to record onto or reproduce sound from a recording member which is supported by a cartridge to be received in the apparatus includes a member supported by the apparatus closely adjacent to the sound means and engaged with a portion of the recording member exposed by the cartridge when the cartridge is received in the apparatus for guiding and positioning said recording member into its proper position relative to the sound means.

The invention and its objects and advantages will become more apparent in the detailed description of the preferred embodiment presented below.

BRIEF DESCRIPTION OF THE DRAWINGS

In the detailed description of the preferred embodiment presented below, reference is made to the accompanying drawings in which:

FIG. 6 is an enlarged, fragmentary side view of the FIG. 1 shroud and adjacent portions of the camera, and illustrating the position of the shroud relative to a sound cartridge (shown in phantom) when the cartridge is fully inserted into the camera in operating position;

FIG. 7 is a section taken along line 7—7 in FIG. 4 with the cartridge removed showing the manner in which a film-strip is directed into the desired position in the camera by the shroud; and FIG. 8 is a section taken along lines 8—8 in FIG. 4 showing the interior of the shroud and illustrating the camera sound apparatus engaged with the film in a sound cartridge and also showing in phantom the location a non-sound cartridge would assume when such a cartridge is fully inserted into the camera in operating position.

DESCRIPTION OF THE PREFERRED EMBODIMENT

Because motion picture cameras, cartridges and related apparatus are well known, the following description is directed in particular to those elements forming or cooperating directly with the present invention, apparatus not specifically shown or described herein being understood to be selectable from those known in the art.

In a preferred embodiment of the present invention, a cinematographic apparatus, such as a sound motion picture camera, includes a shroud member which is adapted to cooperate with a sound recording member such as a filmstrip loaded into a cartridge or cassette. A sound film cartridge especially suitable for cooperating with such a shroud member has been recently developed by modifying a cartridge of the type disclosed in commonly assigned U.S. Pat. No. 3,208,686 entitled FILM CARTRIDGE, issued in the name of E. A. Edwards et al. on Sept. 28, 1965. The sound cartridge includes an aperture which permits sound recording upon the filmstrip loaded in the cartridge. Certain features of the sound cartridge are disclosed in commonly assigned copending U.S. Patent Application Ser. Nos. 248,513 and 256,552 and the disclosures are included herein by reference. Since this sound cartridge includes many of the features of the cartridge disclosed in the Edwards et al patent, and the camera including the shroud is suitable for use with a silent or non-sound cartridge of this type as well, the disclosure of that patent also is included herein by reference.

Figure 1:
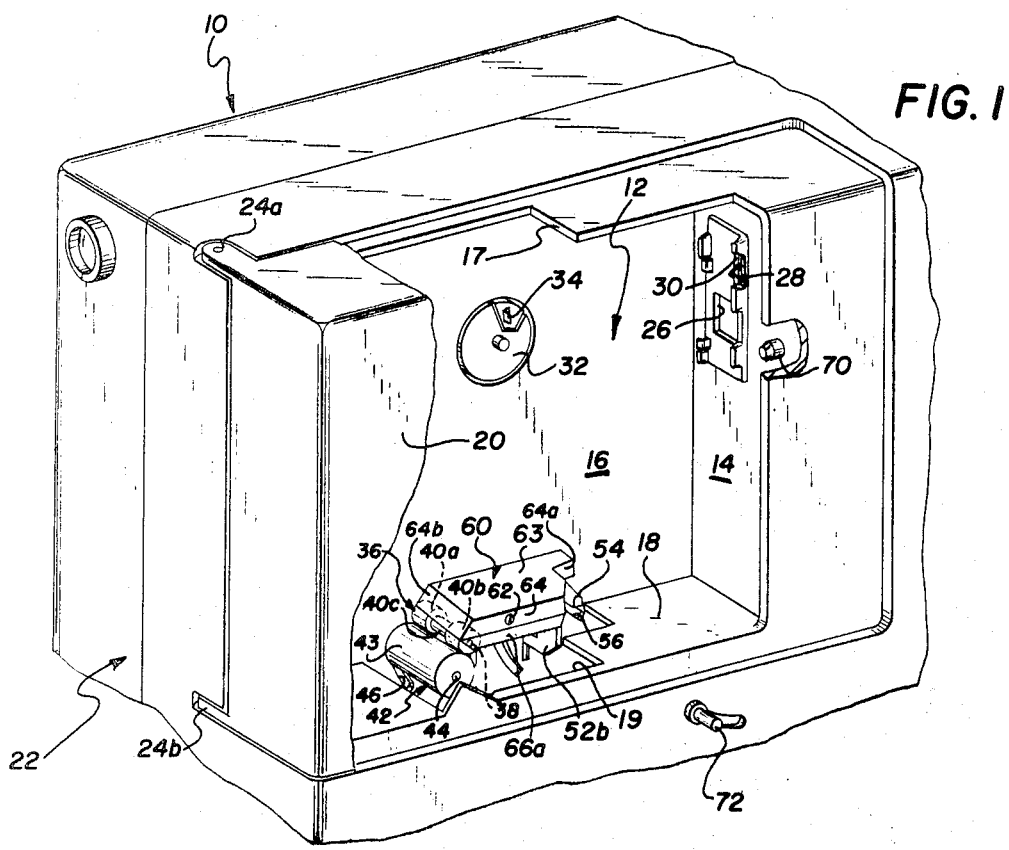
FIG. 1 is a perspective view, partially broken away, showing a preferred embodiment of a motion picture camera including a shroud according to the invention and illustrating the position of the shroud in the cartridge chamber of the camera.

Referring now to the drawings, FIG. 1 shows a portion of a motion picture camera 10 having a chamber 12 for receiving either a sound film cartridge or a silent film cartridge. As illustrated by way of example, chamber 12 is defined by walls 14, 16, 17 and 18 and a cover 20 which is hinged to the body or housing 22 of the camera at 24a and 24b. An opening 19 is provided in wall 18 for certain camera mechanisms described later. An exposure aperture 26 is provided in wall 14 so that film in a received cartridge can be exposed to scene light in a known manner. A claw 28 adjacent the exposure aperture 26 is driven in an opening 30 along a generally rectilinear path for intermittently advancing frames of film through the cartridge. Projecting into chamber 12 for cooperating with a received cartridge is a take-up drive member 32 which is rotatably secured in wall 16. Drive member 32 is of a known type including an eccentric drive lug 34 for cooperating with the take-up core of the received cartridge to wind exposed film into the take-up chamber of the cartridge.

Figure 2:
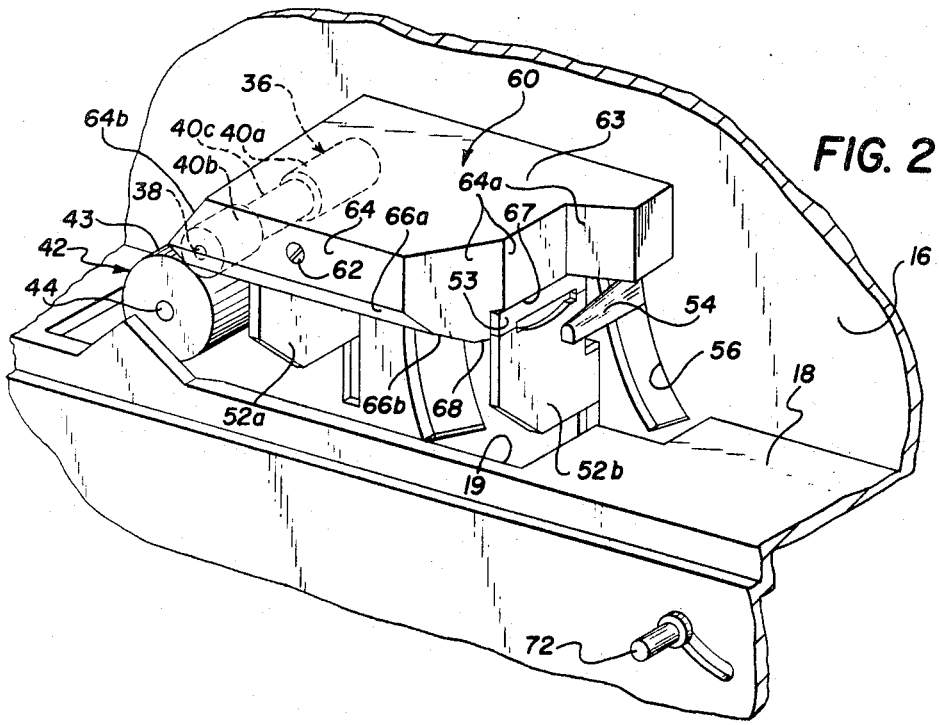
FIG. 2 is an enlarged, fragmentary perspective view of the shroud and portions of the camera.

As may be seen in FIG. 2, a capstan 36 is secured to a shaft 38 which extends into chamber 12 through an opening (not shown) in wall 16. Shaft 38 is driven by suitable means, such as an electric motor (not shown), for driving the capstan 36 at substantially a uniform speed during operation of the camera. The circumferential surface of capstan 36 is undercut or otherwise contoured to define end portions 40a, 40b and a reduced central portion 40c. The width and depth of portion 40c preferably is slightly greater than that of the filmstrip in the cartridge so that the surface of a pressure roller 42 can be resiliently urged into contact with the portions 40a, 40b of capstan 36 and be driven by the capstan with the filmstrip being received within the portion 40c of the capstan. The dimensions of the capstan portion 40c are such that the portion of the film positioned between the end portions 40a, 40b is substantially free of the compressive force between the roller 42 and end portion 40a, 40b of the capstan. The surfaces of portions 40a, 40b of capstan 36 and surface 43 of roller 42 are preferably made of a material having a high coefficient of friction to impart a uniform rate of rotation to roller 42 thereby causing the filmstrip to be driven smoothly by the pressure roller in the manner to be discussed later.

Preferably, roller 42 is mounted for rotation upon a shaft 44 which passes through a slot 46 in wall 16. Shaft 44 is movable from its engaged position shown in FIGS 1, 2 and 8 wherein the roller is in engagement with the capstan to a retracted position (not shown) wherein roller 42 is withdrawn through opening 19 to a position below wall 18 so that a filmstrip may be readily inserted between the capstan and the retracted roller. Movement to the retracted position is effected by a control member 72 described later.

Referring now to FIG. 8, capstan 36 is positioned on wall 16 with respect to the adjacent path for film F, and is offset relative to roller 42 when the surfaces of the capstan and roller are urged together so that a line through shaft 38 and perpendicular to the film path defines an angle of approximately 30° with a line through shafts 38 and 44. As a result, there is a slight wrap of the film around an arcuate segment of the driving surface 43 of roller 42, and a more positive drive to the filmstrip is achieved due to this wrap than would be obtained by only line contact between the film and the surface 43. In other words, this wrap provides more frictional contact between the surface 43 and the film, thereby resulting in a more uniform and positive drive being imparted to the filmstrip by the roller 42.

As is best shown in FIGS. 6–8, a suitable sound head or transducer 48 is supported by wall 16. Film F is urged toward the head by a movable pressure member 50 so that sound can be recorded on a sound track of the film as it is driven between these members by operation of the capstan 36. Pressure member 50 is movable away from its FIG. 8 position by means (not shown) through opening 19 to a retracted position below wall 18 to permit a filmstrip to be inserted between the sound transducer 48 and the pressure member 50. The movement of member 50 is controlled by lever 72 (FIGS. 1 and 2) which will be described in greater detail later.

As is shown in FIGS. 1, 2 and 8, a pair of movable film guides 52a, 52b which cooperate with guide member 53, are positioned along the film path at opposite sides of the sound head 48 to guide the film accurately past the sound head when film is being advanced by the capstan 36. Also shown is a loop sensor 54 that is movable in a slot 56 of wall 16 to engage the film adjacent to film guide 52b, thereby to sense the length of film between the sound head 48 and the exposure aperture 26 of the camera. According to accepted standards for super 8 sound film, there should be 18 film frames separation between the exposure aperture and the film head. The loop sensor 54 is connected to a suitable control means (not shown) that is effective to regulate the speed of the film claw 28 relative to the capstan so that substantially 18 frames separation is maintained. As with pressure roller 42 and pressure member 50, the film guides 52a, 52b, and loop sensor 54 are movable by means (not shown) between an engaged position for recording sound onto the film and a retracted position wherein they are retracted through opening 19 in the wall 18 of the cartridge chamber to facilitate loading and unloading of a cartridge into the camera. The movement of these members, like pressure member 50, is controlled by movement of lever 72 (FIGS. 1 and 2).

In accordance with a preferred embodiment of the present invention, a shroud member 60 is secured to wall 16 of the cartridge chamber 12 of the camera by any suitable means, such as a screw 62. The shroud 60 is irregularly shaped to surround or enclose a portion of the capstan 36 and the sound head 48 and so as to guide a received film into contact with these members as will be discussed in greater detail later. Also, the shroud 60 serges to protect these sensitive members from any unnecessary contact with a cartridge or any foreign object which could be inserted into the cartridge chamber 12 when the cover 20 is in the open position.

The top surface 63 of the shroud is flat and substantially parallel to walls 16 and 18 of the camera. Surface 63 is spaced from the top of chamber 12 by a distance that permits a conventional (silent) super 8 film cartridge 80a (which is shown in phantom in FIG. 8 and is disclosed in the before-mentioned Edwards et al U.S. Pat. No. 3,208,686) to be positioned in chamber 12 above surface 63 and operated in a conventional manner. Shroud 60 includes an outer edge surface 64 which is spaced from, and substantially parallel to, the wall 16 of the camera. Extending between the first end of surface 64 and wall 16 of the camera is an irregularly shaped surface 64a from the second end of surface 64 to wall 16 is an inclined surface 64b. Surface 64a and 64b are appropriately shaped to partially enclose capstan 36 and the sound head 48 and to mate with surfaces of a received sound film cartridge 80 with appropriate clearances therebetween. That portion of the shroud 60 immediately below surface 64 includes inclined or successively tapered surfaces 66a and 66b which serve to guide a portion of the film F under the shroud 60 during the time a sound film cartridge 80 is being inserted into the camera.

In the preferred embodiment of the shroud, the angle of taper between surfaces 66a, 66b and surface 64 is approximately 30° and 45° respectively, as indicated in FIG. 7.

When a sound cartridge 80 is placed into chamber 12, film F moves along surfaces 66a and 66b until it reaches the lower surface 68 at the tip of shroud 60. Surface 68 is substantially perpendicular to wall 16 and surface 64 of the shroud. Once the film F has been received in this position, the film is guided by the shroud under the shroud 60 and into the hollow recess portion 67 of the shroud which extends between tip 68 and wall 16 for positioning the film in contact with film guide 53 and the sound head 48. Thus, as illustrated in FIG. 7, as a sound cartridge is received into the chamber the film is guided into position by surfaces 66a, 66b and 68 and then the film contacts guide member 53 which helps hold the film in alignment with sound head 48 for recording on the sound track of the film F.

Figure 5:
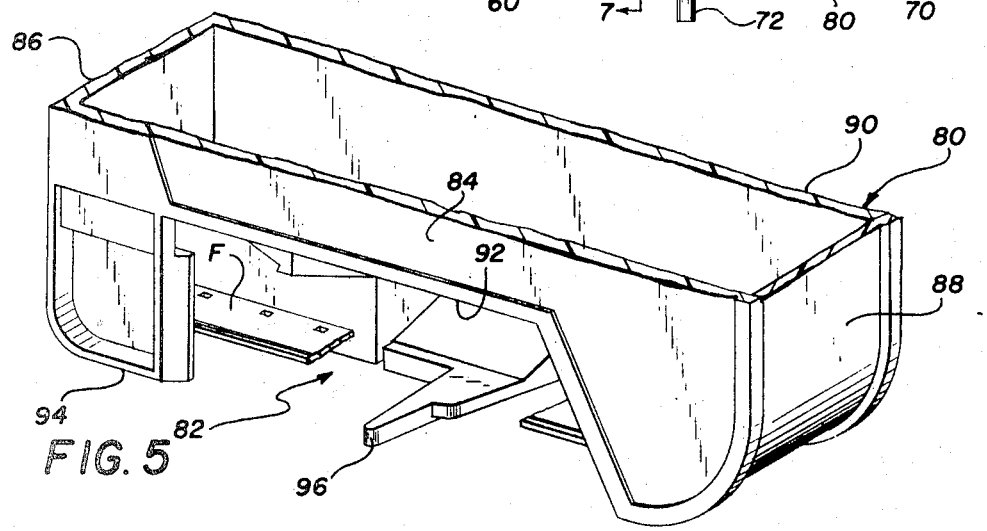
FIG. 5 is an enlarged, fragmentary perspective view of the film cartridge in FIG. 3 showing the portion of the cartridge which cooperates with the shroud member.

As previously mentioned, but may now be better understood, after the above discussion of the shroud, a silent cartridge 80a of the type disclosed in the aforementioned Edwards et al patent and shown in phantom in FIG. 8, could be used in a sound camera as illustrated even with the shroud member positioned in the cartridge chamber. That is, such a non-sound cartridge 80a can be inserted entirely above the shroud in the cartridge chamber and into an operable position relative to the exposure aperture 26, film claw 28 and take-up drive 32. Also, it is apparent from the foregoing description that the camera is adapted to receive a sound film cartridge of the type shown generally at 80 in FIG. 5. The sound cartridge 80 includes a sound aperture 82 which comprises a cut-away or recessed area in the sidewall 84 and bottom wall 94 of the cartridge. Aperture 82 begins near the end wall 86 of the cartridge and extends a major portion of the distance between that wall and the opposite end wall 88 of the cartridge. Also it extends from wall 90 entirely across the bottom of the cartridge and then upwardly along wall 84 to the wall 92 defining one end of the take-up chamber of the cartridge. Wall 92 substantially corresponds to one end wall of a silent or conventional super 8 film cartridge 80a (FIG. 8) as disclosed in U.S. Pat. No. 3,208,686 to Edwards et al. Thus the aperture 82 leaves the major portion of the bottom of the cartridge open not only across bottom wall 94 of the cartridge but also upwardly along wall 84 thereof. As a result, an exposed or unenclosed length of film F extends across aperture 82 of the cartridge and is supported there at a spaced distance from the wall 92 by a finger 96. Finger 96 prevents bowing of the film beyond the aperture opening 82 in wall 94 and also helps guide the film into the loaded position in the camera.

To better understand the manner by which the shroud member 60 cooperates with a sound cartridge in the present embodiment, the sequence of steps taken to prepare the camera for operation will now be discussed. Before a sound cartridge 80 is inserted into the camera 10, cover 20 is opened to permit access to cartridge chamber 12 and the pressure roller 42, pressure member 50, guide members 52a, 52b and loop detector 54 are all moved through opening 19 to their respective retracted positions below the surface of wall 18. Preferably, the various members are coupled (by means not shown) to control member 72 so that it is effective to retract the various members and to allow the cartridge to be inserted into (or removed from) the cartridge chamber 12 of the camera 10.

Figure 3:
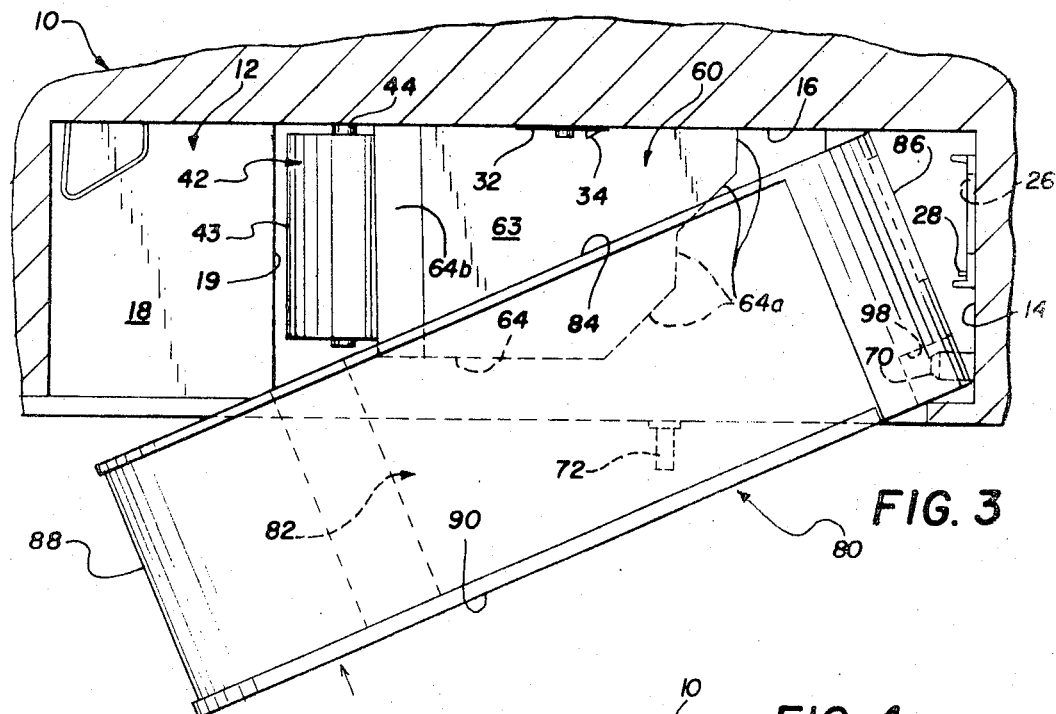
FIG. 3 is an enlarged fragmentary view through the top of the cartridge chamber showing a sound film cartridge partially inserted into the chamber and showing the shroud partially received into a recess or opening in the cartridge.
Figure 4:
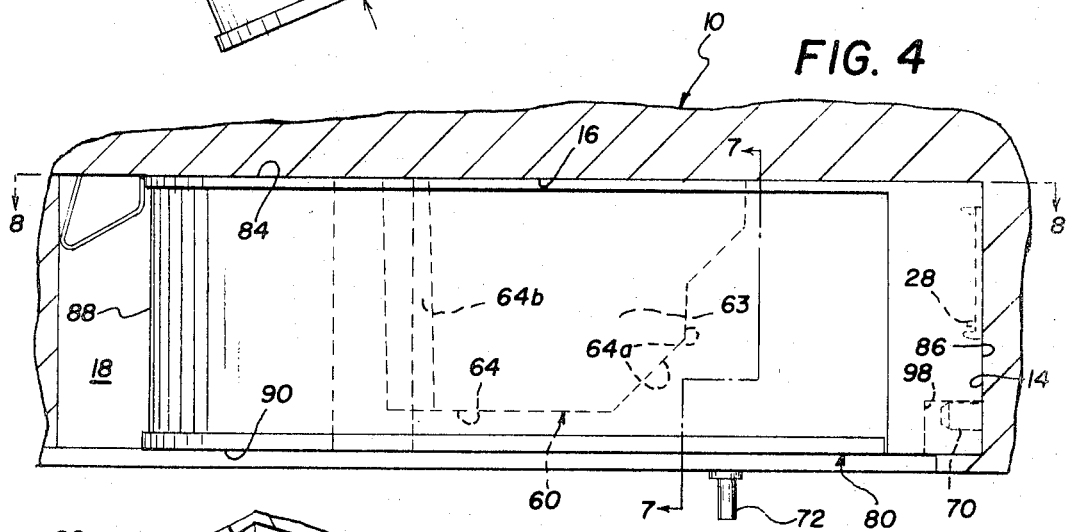
FIG. 4 is a view similar to FIG. 3 but showing the position of the shroud relative to the cartridge when the cartridge is fully inserted into the chamber of the camera.

Referring now to FIGS. 3 and 4, during insertion of a sound cartridge 80 into the cartridge chamber 12 of the camera, the cartridge is positioned generally with wall 84 of the cartridge facing wall 16 of the camera. The cartridge is inclined with respect to wall 16 as shown in FIG. 3, and generally aligned with chamber 12 such that the cartridge will fit between walls 17 and 18 of the chamber. At this time, the portion of aperture 82 in cartridge wall 84 is substantially aligned with the shroud 60. Cartridge 89 is then moved inwardly into the cartridge chamber with a locating notch 98 of the cartridge receiving a pin 70 on the camera for locating the cartridge in the chamber. Pin 70 is positioned in spaced relation to the exposure aperture 26 (see FIG.

1) such that either a sound cartridge 80 or a non-sound cartridge 80a (FIG. 8) can be properly aligned with respect to the exposure aperture 26 by use of pin 70. Also, in the preferred embodiment, the pin 70 locates a sound cartridge 80 such that wall 92 of the cartridge is positioned just above surface 63 of the shroud.

As cartridge 80 is swung into its fully loaded position in the camera (FIG. 4), wall 84 of the cartridge is positioned closely adjacent to camera wall 16 and shroud 60 is positioned in aperture 82 of the cartridge. As previously discussed, during loading of a cartridge into a camera, the film F is guided by shroud 60 into its desired position beneath the sound recording head 48 and the capstan 36 which are positioned below and protected by the shroud 60. Once the cartridge 80 has been completely inserted into the camera as shown in FIG. 4, the cover 20 can be closed and the cartridge is completely contained in the chamber 12 with the shroud 60 in the sound aperture 82 of the cartridge. At such time, lever 72 can be moved ino its operative position causing the film to be contacted by pressure member 50, guide members 52a, 52b and loop detector 54 and permitting the pressure roller 42 to be urged into contact with capstan 36. In practice, roller 42 may be urged against the capstan in response to actuation of a trigger (not shown) used to initiate filming operation of the camera. The film then can be driven along the film path by operation of the capstan 36 such that the sound track of the film is continuously moved past the sound recording head 48 at a constant speed, thereby causing sound to be recorded at the same time image frames are being intermittently advanced through the exposure aperture of the camera.

After exposure of the film in the cartridge, the camera sound apparatus is disengaged from the film by control 72 and the movable portions thereof are again retracted through opening 19 in camera wall 18 so that the cartridge 80 can be easily withdrawn from cartridge chamber 12. The film is readily withdrawn from under shroud 60 for there is a slight slack or looseness of the film across aperture 82 after the film has been exposed due to the release of the pressure rollers.

The invention has been described in detail with particular reference to a preferred embodiment thereof, but it will be understood that variations and modifications can be effected within the sprirt and scope of the invention.

I claim:

1. Cinematographic apparatus having a plurality of walls defining a chamber adapted to receive a cartridge which supports a film strip which is wound into a roll with the sound recording portion of the strip being wound on the inner side of the convolutions of the roll, said apparatus comprising:
   a. sound recording means supported by one of the plurality of walls and projecting into the chamber, said sound recording means comprising a first portion for engaging and recording sound onto the sound recording portion of the film strip when the cartridge is properly loaded into the apparatus and comprising a second portion which is spaced from said sound recording portion of the film strip; and
   b. a shroud member supported by one of the plurality of walls and projecting into the chamber adjacent the sound recording means, said member partially surrounding said second portion, said member having surface portions shaped and positioned for guiding the sound recording portion of the film strip into contact with said recording means as the cartridge is loaded into the apparatus.

2. Apparatus as set forth in claim 1 wherein said shroud member further comprises:
   a first surface that is substantially perpendicular to said supporting wall, a second surface substantially perpendicular to said first surface and spaced from said supporting wall, and a third surface extending from one edge of said second surface and being tapered with respect to said second surface at an angle between 0° and 90°, and said shroud member being positioned for guiding the film strip into position for communicating with said sound recording means.

3. Apparatus as set forth in claim 2 wherein said sound recording means comprises a capstan and a sound recording head which are positionable between said shroud member and the film strip when the cartridge is properly loaded in the apparatus.

4. In a motion picture camera having walls defining a chamber adapted to receive a film cartridge of the type which has an aperture and which supports a length of film extending across the aperture, said camera comprising:
   a. means for recording sound upon said length of film; and
   b. a member supported by one of said walls and partially surrounding said means for recording sound, said member having portions for cooperating with said length of film for guiding and positioning the film relative to said sound recording means as the cartridge is received into the chamber of the camera, said member projecting into the chamber and being positioned to be received by the aperture in the cartridge so that it is interposed between the cartridge and the film strip when the cartridge is loaded in the camera.

5. A camera as set forth in claim 4 wherein said member has a plurality of adjacent surface portions positioned to be contacted by the film strip as the cartridge is inserted into the chamber and to deflect the film into a position wherein said sound recording means can contact the film.

6. In a motion picture camera for use with a film cartridge, the camera having walls defining a chamber for the cartridge, said cartridge comprising walls and having an aperture in one of said walls to permit access to an inner surface of a filmstrip contained therein, the improvement comprising:
   a. a recording member for recording sound on the inner surface of the filmstrip; and
   b. a shroud which partially encloses said recording member for guiding said filmstrip into a predetermined position adjacent to said recording member, the shroud being mounted on one of the camera walls defining the chamber and being spaced from the other walls defining the chamber.

7. In a motion picture camera having a plurality of walls defining a chamber for receiving a film cartridge, the cartridge having an aperture adjacent one end portion thereof across which a film strip extends, and having a capstan and sound transducer, the improvement comprising:
   a shroud mounted on one wall of the cartridge chamber adjacent to and partially enclosing the capstan and sound transducer and projecting therefrom into the chamber, the shroud including a first surface that is substantially perpendicular to said one wall, a surface substantially perpendicular to the first surface and spaced from said one wall, and a third surface extending from one edge of the second surface and being tapered with respect to the second surface at an angle between 0° and 90°, the shroud being positioned in the cartridge chamber so that it can be received in the aperture of the cartridge when the cartridge is positioned in the chamber with said third surface cooperating with the film strip extending across the aperture of the cartridge during insertion of the cartridge into the chamber, the third surface of the shroud being positioned with respect to the capstan and sound transducer to guide the film strip into an operative position with respect to the capstan and sound transducer.

8. In a cinematographic apparatus having a chamber defined by a plurality of walls, the chamber being adapted to receive a film cartridge carrying a roll of an elongate strip of film having opposite first and second sides and a connecting edge, the cartridge having an aperture through which the film extends along a film path wherein the film is accessible from both first and second sides with the first side of the film being disposed inwardly toward the roll of film and carrying thereon a sound recording portion, the improvement comprising:
  a. sound transducer means supported by one of the plurality of walls and extending into the chamber for communicating with the sound recordng portion on the first side of the film when the cartridge is received in said chamber; and
  b. shroud means supported by one of the plurality of walls and projecting into the chamber adjacent to said sound transducer means, said shroud means surrounding a first portion of said transducer means and leaving unenclosed a second portion of said transducer means, said second portion being disposed along the film path, said shroud means being receivable into the aperture in the cartridge and suitably shaped for cooperating with the edge and the first side of the film to guide the sound recording portion on the first side of the film into position for communicating with said second portion of the sound transducer means as the cartridge is received into said chamber.

9. The improvement as set forth in claim 8 further comprising a capstan positioned adjacent said sound transducer, said shroud means surrounding a first portion of said capstan and leaving unenclosed a second portion of said capstan, said second portion being disposed along the film path for communicating with the first side of the received film for driving the film along the film path.

10. The improvement as set forth in claim 9 wherein said shroud means further comprises:
  a first surface that is substantially perpendicular to said supporting wall, a second surface substantially perpendicular to said first surface and spaced from said supporting wall, and a third surface extending from one edge of said second surface and being tapered with respect to said second surface at an angle between 0° and 90°, and said shroud being positioned in the cartridge chamber for being interposed into the aperture of the cartridge when the cartridge is positioned in the chamber with said third surface cooperating with said connecting edge and said first side of the received film strip for guiding the film strip into position for communicating with said sound transducer and said capstan.

* * * * *